May 22, 1956 C. J. LE BEL 2,747,158
TEMPERATURE COMPENSATED CIRCUIT HAVING NON-LINEAR RESISTOR
Filed May 24, 1950
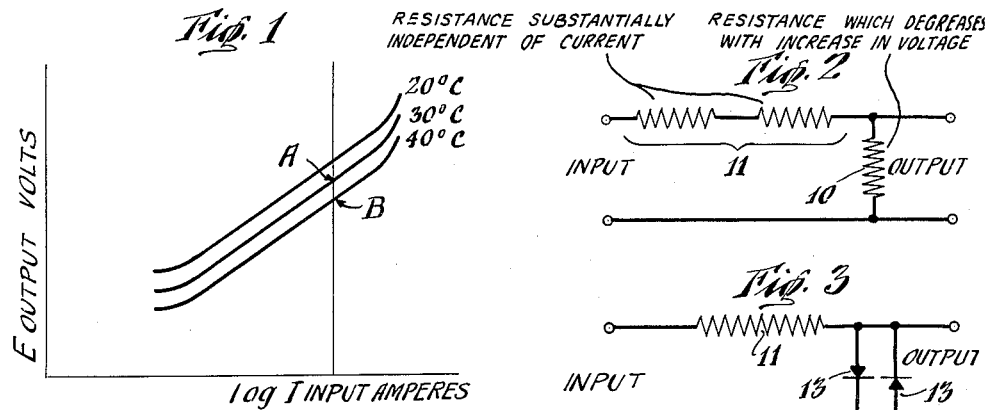
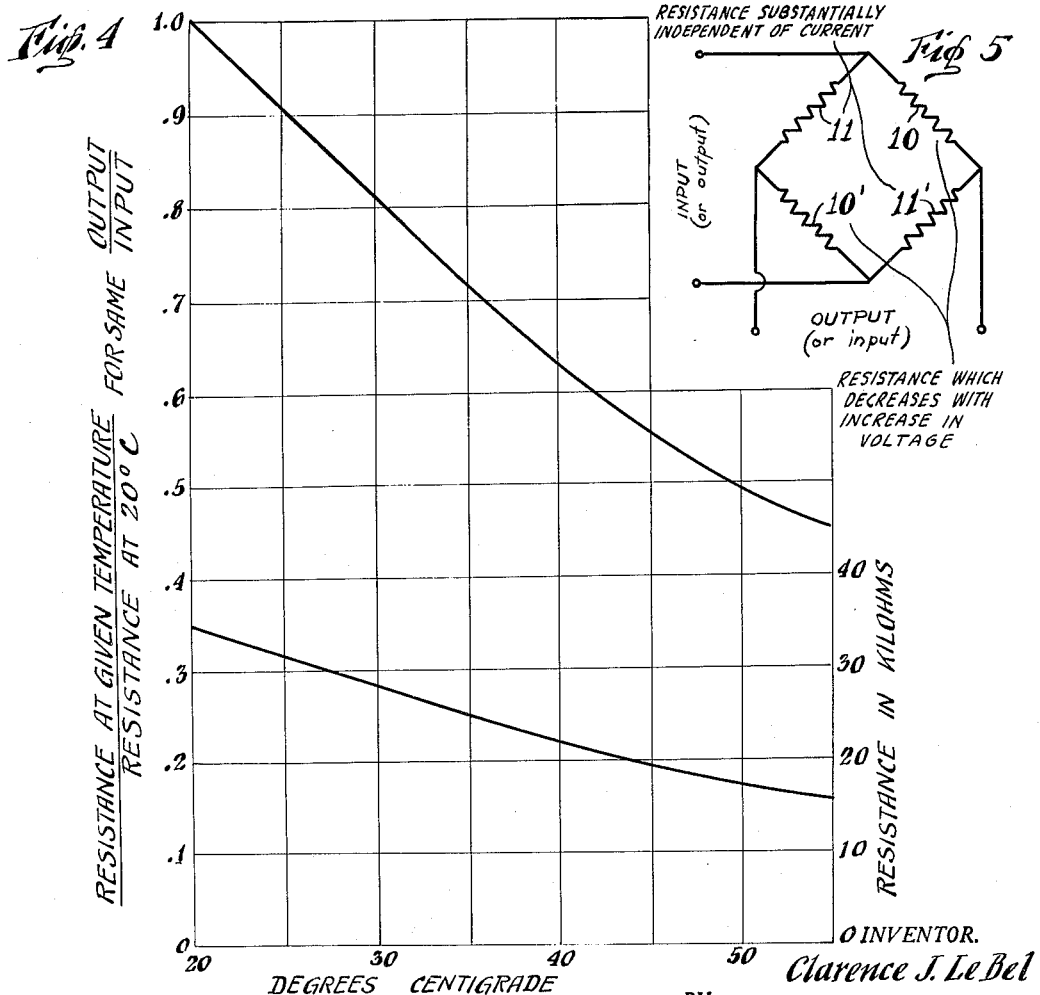
INVENTOR.
Clarence J. LeBel
BY
Bohleber, Jassett & Montstream
ATTORNEYS

United States Patent Office 2,747,158
Patented May 22, 1956

2,747,158
TEMPERATURE COMPENSATED CIRCUIT HAVING NON-LINEAR RESISTOR

Clarence J. Le Bel, New York, N. Y.

Application May 24, 1950, Serial No. 164,000

5 Claims. (Cl. 323—69)

The invention relates to a circuit including a non-linear element or resistor which is compensated for changes in resistance caused by changes in the temperature of the non-linear resistor by a temperature sensitive resistance means connected in series therewith. In particular the invention relates to a circuit including a resistor having a non-linear resistance which changes with changes in current therethrough but which also changes in resistance with changes in the surrounding or ambient temperature as illustrated by the curves in Fig. 1. The curves are plotted on a logarithmic scale for the current I input. The shape of the curve does not vary for changes in the surrounding temperature but its position shifts with changes in temperature. In fact for one such resistor a change in surrounding temperature from 70° to 120° Fahrenheit reduces the output voltage by about ½. The circuit herein compensates for such changes in resistive characteristics upon changes in the ambient temperature so that changes in temperature over a wide range does not change the output voltage or substantially change it from the output desired. Such circuits may be used as an element in many more complex circuits such as bridges, net works and the like. The term resistor herein may include one or more such units or elements connected in series or parallel including biased pairs.

It is an object of the invention to construct a circuit including a non-linear resistor, the resistance of which, and hence the output voltage, changes with a change in the ambient temperature, so that the output voltage secured is that which would have resulted had there been no temperature change. The circuit therefore accurately or substantially compensates for changes in resistance caused by changes in the ambient temperature.

Another object of the invention is to construct a new, novel and relatively inexpensive circuit including a resistor whose resistance and hence the output voltage varies with applied voltage with a logarithmic law and which also varies with surrounding temperature and which circuit compensates for the variation caused by temperature with a resistive means connected in series therewith so that the desired voltage output is secured, irrespective of the changes of temperature.

Another object of the invention is to construct a circuit which compensates for the variations in resistive characteristics of a resistor whose resistance changes logarithmically with current or input voltage and upon changes in ambinet temperature and which combines the temperature compensating characteristic of two or more resistive means of different temperature co-efficients in order to provide a combined temperature co-efficient of the proper value.

Other objects of the invention will be more apparent from the following description when taken in connection with the accompanying drawings in which:

Figure 1 is a chart or graph which illustrates curves of the changes in output voltage on changes in input current for different temperatures;

Figure 2 is a circuit utilizing a non-linear resistor and a temperature compensating resistive means in series therewith;

Figure 3 is a circuit including non-linear resistors utilizing rectifying resistors in two way pair for alternating current and a temperature compensating resistive means in series therewith;

Figure 4 is a graph or chart of curves showing the changes in the resistance of a compensating means for a germanium resistor for changes in temperature from 20 to 55 degrees centigrade; and Figure 5 shows a bridge circuit utilizing the compensating circuit.

Resistors whose resistance changes non-linearly upon changes in current therethrough or input voltage are well known. They include copper-oxide and germanium crystal rectifying resistors and silicon carbide material known as Thyrite. Other semi conductors exhibit the same characteristic. These materials have an advantage in that they respond instantaneously to input voltage changes. Furthermore each of the non-linear resistors particularly mentioned, upon changes in current or circuit input voltage produce output voltages which are proportional to the logarithm of the current therethrough or the circuit input voltage over a portion of their range. The non-linear characteristic desired is that found when connected in a direction in which increasing voltage results in a decreasing resistance. This direction is also known as the forward direction. The resistors however are sensitive to or their output voltage changes with changes in surrounding temperature and it is for this reason that where accuracy is, and it usualy is, an important factor, the resistor is incased in a so-called oven which is heated and thermostatically controlled to maintain a constant operating temperature. Such thermostatically controlled assemblies are expensive, bulky and in order to limit the error due to temperature to 1% requires a temperature stability of about .5 to 1 degree Fahrenheit. This is not easy to obtain. Furthermore it takes considerable time to bring the oven and resistors to the operating temperature which may take as much as an hour if the surrounding temperature differs materially from the operating temperature. The circuit herein permits the resistor to change its temperature with the surrounding temperature and secures compensation for changes in temperature in an inexpensive manner, with much greater compactness, with accuracy and with no or slight delay.

The circuit includes a non-linear resistor 10 as in Figure 2 or 13 as in Figure 3 and a resistive means 11 connected in series therewith; the resistance of the latter is substantially independent of current and of such value that the input current is substantially unaffected by changes in resistance of the non-linear resistor. This circuit may be used in net works, bridges and wherever the particular characteristics of the non-linear resistor is desired.

For accurate compensation the resistance means 11 which is connected in series with the non-linear resistor must have or closely approximate a characteristic such that its resistance changes with temperature in an amount the same as or proportional to the change in the resistance of the non-linear resistor. For example, referring to Figure 1, with the current remaining constant the voltage output of a non-linear resistor for a temperature of 30° would be that at the point A and the voltage output for a temperature of 40° would be that at the point B. These curves are not accurately plotted but are drawn merely for the purpose of illustration. The resistance means connected in series with the non-linear resistor must change its resistance for the same temperature change such that the output voltage across the non-linear resistor will not vary from the value at the point A. It requires, therefore, that the temperature compensating resistance means must have a resistance characteristic change which changes equally or proportionately with or substantially equally in amount or proportionately with that occurring in the non-linear resistor as the temperature changes. An equal change is a proportionality of 1:1. For many applications where approximate compensation is sufficient any resistance means whose resistance changes in the proper direction with changing temperature may be used as a compensating means.

The resistance variation characteristic of the resistance means to compensate a non-linear resistor or a given logarithmic material due to changes in temperature, may be determined in a simple manner by the following procedure. The resistor is connected in a circuit the same as that in which it will be used, and the non-linear resistor is placed in an oven, the temperature of which is adjustable. The resistance means in the circuit in series with the resistor is a calibrated adjustable resistance. The input voltage is maintained constant. The temperature of the oven is changed and hence the temperature of the non-linear resistor and the calibrated adjustable resistance means changed so that the output voltmeter reading remains constant. The temperature and resistance of the adjustable resistance is recorded. By plotting a graph of the adjustable resistance value versus temperature, the relationship between resistance and temperature for that particular resistor is established exactly. A resistance means is then sought whose variation in resistance with temperature is the same or proportional to or approximates that necessary to compensate for the resistive changes due to temperature changes occurring in the non-linear resistor.

Iron hydrogen ballast tubes, metallic filaments, and thermistors are temperature sensitive resistance means which may be used as compensating elements. For example the change in the resistance of a germanium crystal such as the commercial diode known as Sylvania type 1N-34 is closely compensated for by connecting in series therewith a Stupakoff temperature sensitive resistance means shown in Bulletin No. 249A issued by the Stupakoff Ceramic and Manufacturing Company. A satisfactorily close approximation to the compensation desired may also be secured by a thermistor made of No. 2 thermistor material manufactured by Carboloy Company, Inc. Resistive means with negative temperature co-efficients are well known and are made by using various metallic oxides or mixtures thereof. By combining different oxides, various temperature co-efficients may be secured. If no resistive means having the proper temperature co-efficient is available one may be secured by selecting a resistive means whose co-efficient is higher than that desired and connecting in series therewith a resistive means whose temperature co-efficient is less than that desired, and with a combined characteristic or temperature co-efficient which corresponds accurately or approximately with the compensation desired for the non-linear resistor. Similarly a resistance means having a negative resistance characteristic, the temperature co-efficient of which is greater than that desired, may be combined with a resistance means having a positive resistance characteristic to give a co-efficient approximating that of the non-linear resistor. The compensation also may be modified by net works in shunt or series or both.

Figure 5 illustrates a bridge circuit of the invention in which the non-linear resistor 10 and compensating resistance means 11 are in opposite arms as are non-linear resistor 10′ and compensating resistor means 11′. It is clear that 10′ and 11′ may be replaced by usual resistances. In this bridge circuit of Figure 5 as well as that of Figures 2 and 3, the compensating resistance means is connected with the non-linear resistor in compensating relation.

It is understood that a plurality of non-linear resistor elements or units may be connected in series in order to secure the desired voltage output or in parallel to secure the desired current input. A non-linear resistor as used herein means one or more non-linear elements connected in series or parallel including pairs connected for alternating current. The output voltages may be amplified also if that should be desired. Again the voltage variation of the resistance means may be amplified before being fed or presented to the non-linear resistor.

This invention provides an improvement in a temperature compensated circuit having non-linear resistor. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A non-linear circuit compensated for variation in temperature comprising a non-linear resistor having an instantaneous response to variation in input voltage and having a variation in its resistance upon changes in temperature, the resistor including one or more non-linear units connected together in series in a direction of like resistive characteristic and in the direction in which increasing voltage results in decreasing resistance, output connections having the non-linear resistor solely therebetween, a linear resistance means in series therewith having a resistance which is substantially independent of current and having a variation in resistance upon changes in temperature in the same direction and of substantially a proportional amount as that of the non-linear resistor, and input connections including therebetween the non-linear resistor and the linear resistance means.

2. A non-linear circuit as in claim 1 in which the non-linear resistor has a resistance which decreases with an increase in temperature, and the resistance means in series therewith has a resistance which decreases upon an increase in temperature and of a substantially proportional amount.

3. A non-linear circuit compensated for variation in temperature comprising a resistor having an instantaneous response to variation in input voltage and having a resistance which varies logarithmically with the applied voltage over a portion of its range, the resistor including one or more non-linear units connected together in series in a direction of like resistive characteristic and in the direction in which increasing voltage results in decreasing resistance the resistor decreasing in its resistance upon increase in temperature, output connections having the resistor solely therebetween, linear resistance means connected in series with the resistor having a resistance which is substantially independent of current, the resistance means having a decrease in its resistance upon increase in temperature and of an amount substantially equal or proportional to that of the resistor and input connections including therebetween the resistor and the linear resistance means.

4. A non-linear circuit as in claim 3 in which the resistance means includes at least one thermistor.

5. A non-linear circuit as in claim 3 in which the resistance means includes a first thermistor whose resistance change with temperature is greater than that of the resistor and a second thermistor in series with the first thermistor whose resistance change with temperature is less than that of the resistor, and the combined resistance change of both thermistors with temperature is of a substantially proportional amount as that of the resistor.

References Cited in the file of this patent

UNITED STATES PATENTS

| 1,883,613 | Devol | Oct. 18, 1932 |
| 2,050,703 | Johnson | Aug. 11, 1936 |
| 2,114,330 | Borden | Apr. 19, 1938 |
| 2,278,633 | Bagnall | Aug. 7, 1942 |
| 2,304,044 | Whittle | Dec. 1, 1942 |
| 2,332,073 | Grierson | Oct. 19, 1943 |
| 2,356,269 | Potter | Aug. 22, 1944 |
| 2,533,287 | Schmitt | Dec. 12, 1950 |

FOREIGN PATENTS

| 456,947 | Great Britain | Nov. 18, 1936 |
| 547,304 | Great Britain | Aug. 21, 1942 |